United States Patent
Valz

(10) Patent No.: US 9,076,148 B2
(45) Date of Patent: Jul. 7, 2015

(54) DYNAMIC PRICING MODELS FOR DIGITAL CONTENT

(75) Inventor: Duane R. Valz, Emeryville, CA (US)

(73) Assignee: YAHOO! INC., Sunnyvale, CA (US)

( * ) Notice: Subject to any disclaimer, the term of this patent is extended or adjusted under 35 U.S.C. 154(b) by 1630 days.

(21) Appl. No.: 11/615,602

(22) Filed: Dec. 22, 2006

(65) Prior Publication Data

US 2008/0154798 A1 Jun. 26, 2008

(51) Int. Cl.
G06Q 30/06 (2012.01)
G06Q 30/08 (2012.01)
G06Q 30/02 (2012.01)
G06F 17/30 (2006.01)

(52) U.S. Cl.
CPC .......... *G06Q 30/02* (2013.01); *G06Q 30/0283* (2013.01); *G06F 17/30867* (2013.01)

(58) Field of Classification Search
CPC .............................. G06Q 30/06; G06Q 30/08
USPC .................................... 705/26, 27, 26.1, 27.1
See application file for complete search history.

(56) References Cited

U.S. PATENT DOCUMENTS 7,080,030 B2 7/2006 Eglen et al.
7,146,416 B1 12/2006 Yoo et al.

2003/0046161 A1* 3/2003 Kamangar et al. .............. 705/14
2003/0120551 A1 6/2003 Schwartz et al.
2006/0229950 A1* 10/2006 Pabbisetty et al. .............. 705/26

FOREIGN PATENT DOCUMENTS

| JP | 2001-338117 | 7/2001 |
| JP | 2001-229231 | 8/2001 |
| JP | 2002-15175 A | 1/2002 |
| JP | 2002-269275 A | 9/2002 |
| JP | 2005-284978 | 10/2005 |
| WO | WO 03/046764 | 6/2003 |
| WO | WO 2005043345 | 5/2005 |

OTHER PUBLICATIONS

PCT Notification of Transmittal of the International Search Report and the Written Opinion of the International Searching Authority, or the Declaration, mailed Apr. 15, 2008, PCT/US2007/087938.
U.S. Appl. No. 11/150,320, filed Nov. 15, 2006, Martinez, et al.

* cited by examiner

*Primary Examiner* — James Zurita
(74) *Attorney, Agent, or Firm* — James J. DeCarlo; Greenberg Traurig, LLP

(57) ABSTRACT

Dynamic pricing models which facilitate efficient distribution of digital content online. Particular implementations of the invention dynamically base pricing for digital content on relatively current, aggregated information regarding Internet user behavior and preferences, such as search query and/or page hit logs. Some implementations of the present invention are directed to pricing digital content based on the inherent properties of digital content and the mechanics of how electronic files are typically distributed on the Internet.

24 Claims, 5 Drawing Sheets

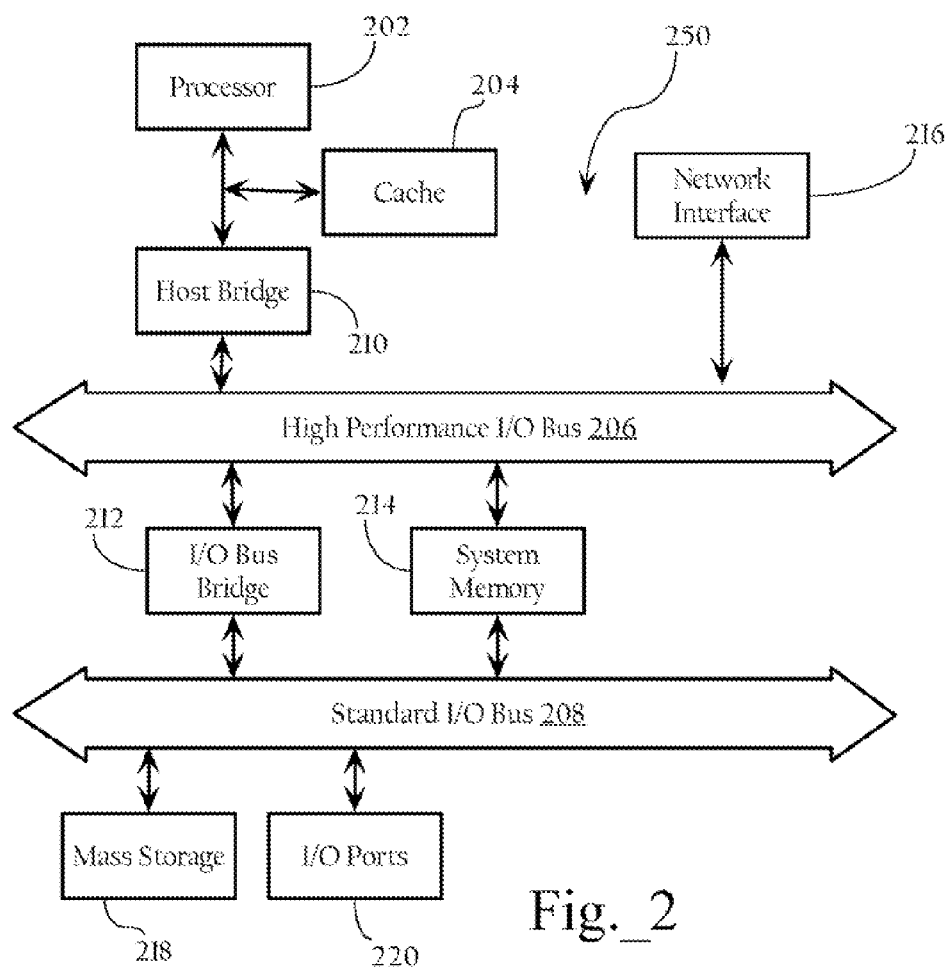
Fig. _2

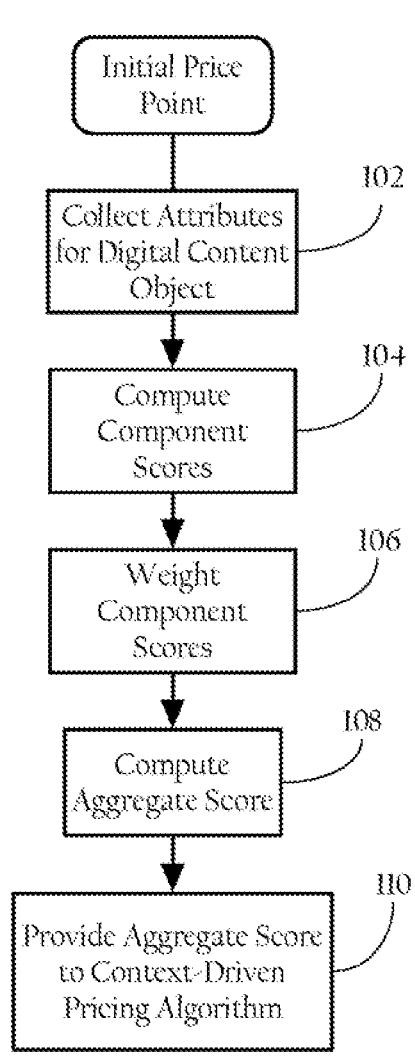
Fig._3
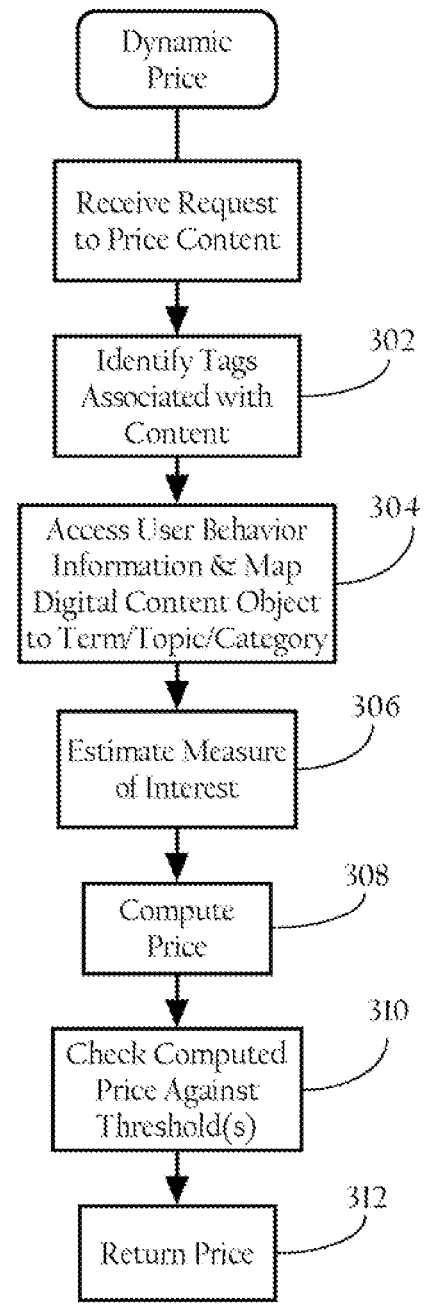
Fig._4

DYNAMIC PRICING MODELS FOR DIGITAL CONTENT

TECHNICAL FIELD

The present disclosure relates generally to dynamic pricing mechanisms.

BACKGROUND OF THE INVENTION

Intellectual Property Rights (IPRs), from their inception, have existed to preserve for owners of original ideas and unique, creative works ("underlying works") the ability to restrict, and set the terms for, the use, sale, reproduction and distribution of such underlying works. Legal enforcement of IPRs against those who infringe or misappropriate underlying works, however, is usually regarded as a course of last resort based on the transactional costs and time associated with such enforcement. More typically, the owners of IPRs to underlying works prefer to develop markets for such works which (1) make the creation, reproduction or alteration of the underlying works technically difficult or expensive, (2) facilitate volume distribution of the underlying works, and (3) enable price points for the underlying works that incentivize legitimate uses of the works and dissuade unpermitted uses. Taking historical examples in the world of copyrights, printing presses were relatively expensive for all except volume producers of books and other printed materials. Only those publishers who developed good distribution channels and popular printed works were successful. Wax record etchers were perhaps not so expensive to obtain, but during the prime era of their usage one needed access to the talent who would produce original recorded content for the metallic master from which multiple wax copies were then made, which was difficult to accomplish for all but well known record labels. For those who could afford the means for producing quality books and records, and cultivate a big enough market of consumers to recoup their investments and earn a profit, came the ability to do so by charging attractive prices for these underlying works.

The advent of digital content and the Internet has undermined the traditional assumptions surrounding the creation, use and distribution of underlying works by IPR owners. The tools for creating quality digital content—such as digital cameras, video recorders and audio mixing equipment—have become relatively inexpensive, thus enabling many more people to be creators of quality underlying work. Similarly, the Internet enables an easy and inexpensive way for digital content creators to distribute and offer for sale their underlying works. The tremendous ease by which digital content can be reproduced, altered and then distributed on the Internet creates, on the one hand, an inexpensive network through which underlying works can be offered for sale and use on a mass scale. On the other hand, however, both digital content creation tools and the Internet severely erode IPR owners' ability to restrict and set desirable terms for the reproduction, alteration and distribution of their underlying works. Traditional IPR owners, particularly, who are used to obtaining high financial returns on the sale, use and distribution of their underlying works, have been reluctant to make such works readily available in digital media and on the Internet because they fear an inability to track, and recoup a proper value for, all the uses to which their underlying works may eventually be put.

Mechanisms are needed that facilitate the creation of marketplaces for digital content which better incentivize IPR owners to make their underlying works of digital content available for sale and distribution. Such mechanisms can take multiple forms, including technologies to inhibit or detect unpermitted uses, reproductions and distributions of digital content ("DRM"). There are many DRM solutions in the marketplace. But DRM, by itself, has had only a limited impact on facilitating efficient marketplaces for the sale and distribution of digital content. Another such mechanism is an online repository for centrally collecting and managing the distribution of digital content, as well as the IPRs associated with such content. One such mechanism is disclosed in currently pending U.S. application Ser. No. 11/560,320 filed on Nov. 15, 2006.

SUMMARY

The present invention is directed to dynamic pricing models which facilitate efficient distribution of digital content online. Particular implementations of the invention dynamically base pricing for digital content on relatively current, aggregated information regarding Internet user behavior and preferences, such as search query and/or page hit logs. Some implementations of the present invention are directed to pricing digital content based on the inherent properties of digital content and the mechanics of how electronic files are typically distributed on the Internet. Such pricing models may employ (1) baseline values derived from the inherent features of the digital content, and (2) real-time data from algorithmic search engines and other Internet sources of aggregated information regarding user preferences and contextual user behavior to continually price and reprice digital content within parameters set by predetermined rides and algorithms. Drawing from one or more sources of relatively current, aggregated information about Internet user preferences and behavior, the disclosed dynamic pricing models provide an improved means of facilitating efficient marketplaces for the distribution of digital content and better realization of the value attributable to such content.

DESCRIPTION OF THE DRAWINGS

FIG. 2 is a schematic diagram illustrating an example computing system architecture that may be used to implement one or more of physical servers.

FIG. 3 is a flow chart illustrating a method according to one particular implementation of the invention.

FIG. 4 is a flow chart illustrating a method according to one particular implementation of the invention.

DESCRIPTION OF EXAMPLE EMBODIMENT(S)

A. Overview

Particular implementations of the invention dynamically base pricing for digital content on relatively current, aggregated information regarding Internet user behavior and preferences, such as search or query logs. Some implementations of the present invention are directed to pricing digital content based on the inherent properties of digital content and the mechanics of how electronic files are typically distributed on the Internet. Such pricing models may employ (1) baseline values derived from the inherent features of the digital content, and (2) real-time data from algorithmic search engines and other Internet sources of aggregated information regarding user preferences and contextual user behavior to continually price and reprice digital content within parameters set by predetermined rules and algorithms. Drawing from one or more sources of relatively current, aggregated information about Internet user preferences and behavior, the disclosed dynamic pricing models provide an improved means of facilitating efficient marketplaces for the distribution of digital content and better realization of the value attributable to such content.

The present invention can be implemented in a variety of manners. In some particular implementations, one or more of the following events or processes can occur. In some implementations, a user may upload a digital content object to a network addressable system, such as a media aggregation site (an example being Yahoo!(r)'s Flickr® photo sharing system). The user or other entities may configure one or more tags for association with the digital content object. The network addressable system stores the tags and related information in association with the uploaded content object. Users may access the network addressable system and uploaded content through, for example, a client application, such as a browser. In other implementations, a user may access a dynamic pricing system and specify one or more tags, and possibly other information, to receive a price without uploading the content. In some implementations of the invention, the dynamic pricing functionality described herein can be accessible as a web-based service presenting one or more application programming interfaces (APIs) that other systems can use to receive a dynamically computed price on demand for a given digital content object.

A.1. Network Environment

Particular implementations of the invention operate in a wide area network environment, such as the Internet, including multiple network addressable systems. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like.

Figure 1A:
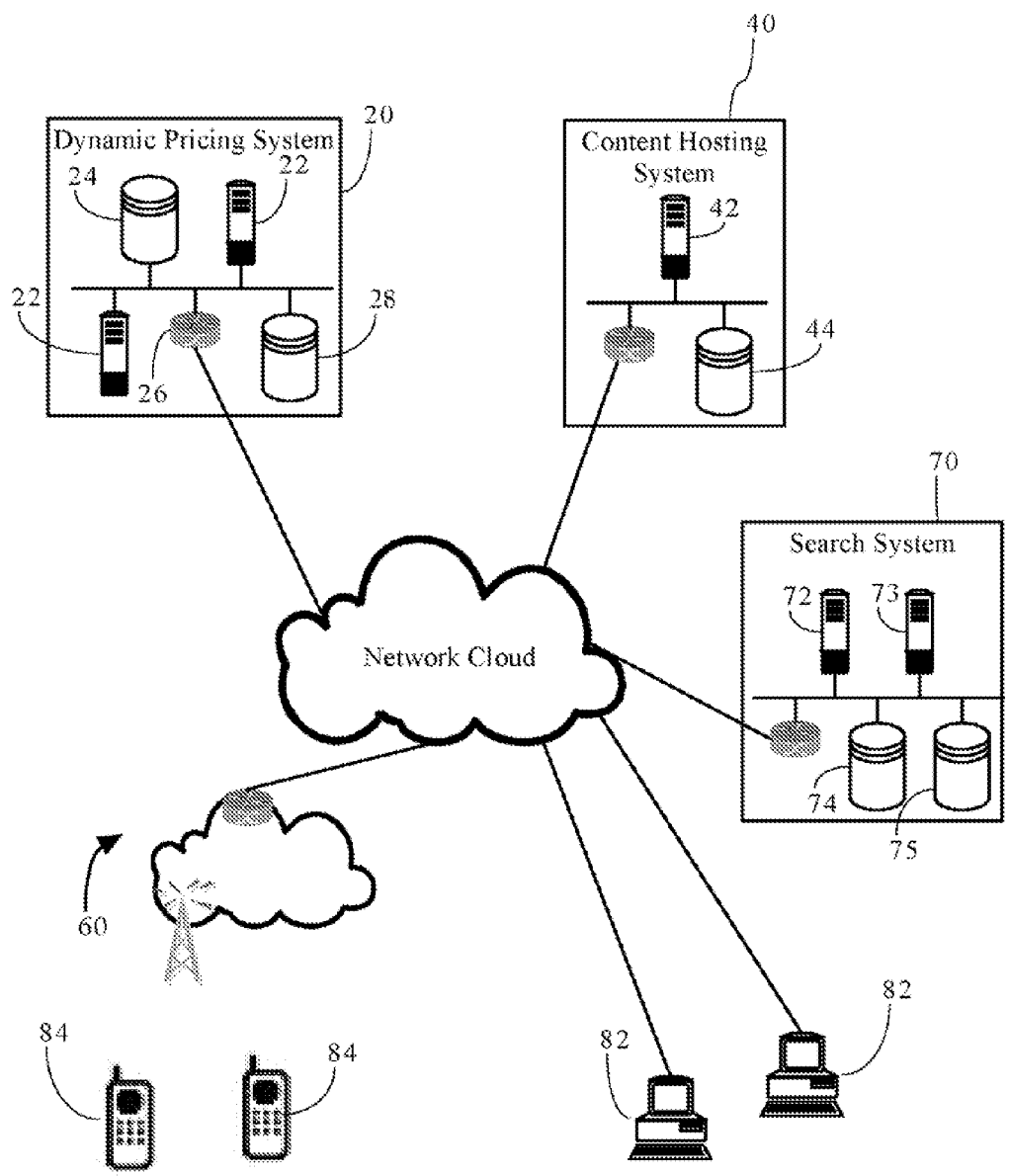
FIG. 1A illustrates an example network environment in which particular implementations may operate.

As FIG. 1A illustrates, a particular implementation of the invention can operate in a network environment comprising dynamic pricing system 20, content hosting site 40, and search system 70. Although FIG. 1A illustrates the foregoing systems as separate systems, the functionality represented by each system may be combined into other systems. Furthermore, the functionality represented by each depicted system may be further separated. Still further, implementations of the invention may operate in network environments that include multiples of one or more of the individual systems and sites disclosed herein. In addition, other implementations may operate in network environments where one or more of the systems described herein have been omitted. Client nodes 82, 84 are operably connected to the network environment via a network service provider or any other suitable means.

A.1a. Dynamic Pricing System

Dynamic pricing system 20 is a network addressable system that hosts dynamic pricing functionality. Dynamic pricing system 20, in one implementation, comprises one or more physical servers 22 and user behavior data store 24. The one or more physical servers 22 are operably connected to computer network 80 via a rooter 26. The one or more physical servers 22 host functionality that is operative to compute prices for digital content objects. In one implementation, the functionality hosted by the one or more physical servers may include web or HTTP servers, FTP servers, and the like. In some implementations of the invention, the one or more physical servers 22 are accessible to remote systems as a web service, using Simple Object Access Protocol (SOAP), HTTP, or other suitable protocols.

User behavior data store 24 stores aggregated information regarding Internet user behavior and preferences. Structurally, content data store 24 connotes a large class of data storage and management systems. In particular implementations, content data store 24 may be implemented by any suitable physical system including components, such as database servers, mass storage media, media library systems, and the like.

Figure 1B:
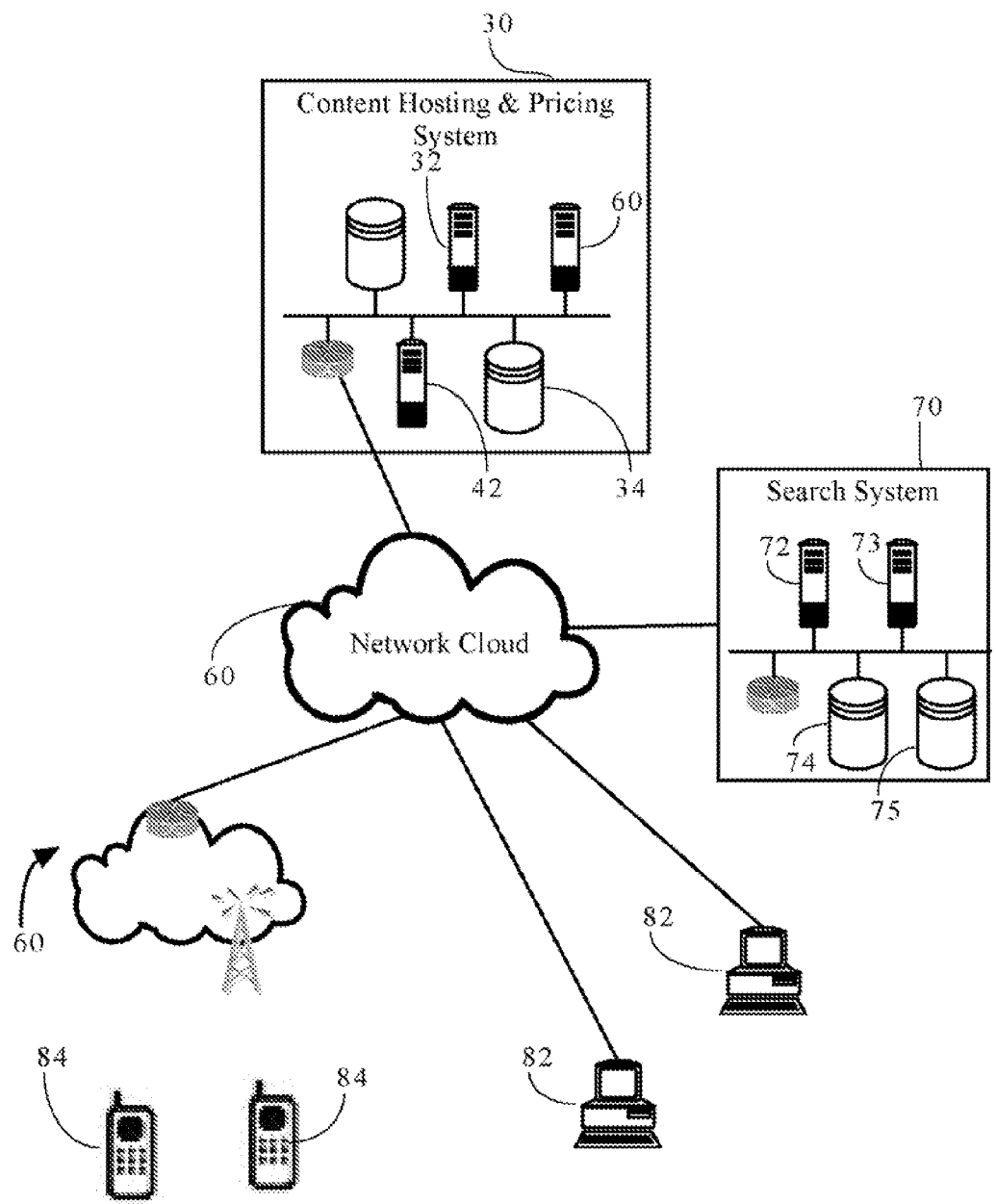
FIG. 1B illustrates another example network environment in which particular implementations may operate.

A variety of implementations are possible. For example, while FIG. 1A illustrates dynamic pricing system 20 as a separate system, this functionality may be implemented as an integrated system including search system 70 and/or content hosting system 40. For example, as FIG. 1B illustrates, content hosting and pricing system 30 may include content hosting and dynamic pricing functionality. In another implementation, dynamic pricing system 20 may access data from remote systems, such as search system 70, for data used in computing a price. In yet other implementations, search system 70 may reside within the same domain or be collocated with dynamic pricing system 20. In another implementation, one or more other databases containing relatively current, aggregated information regarding Internet user behavior and preferences, such as those containing up to date user survey feedback on various topics, can be accessed and used in connection with search system 70, to generate data used by dynamic pricing system 20 in computing a price.

A.1.b. Content Hosting System

Content hosting system 40 is a network addressable system that hosts one or more digital content objects accessible to one or more users over a computer network. In one implementation, content hosting system 40 may be an informational web site where users request and receive identified web pages and other content over the computer network. Content hosting system 40 may also be an on-line forum or blogging application where users may submit or otherwise configure content for display to other users. Content hosting system 40 may also be a content distribution application, such as Yahoo! Music, Apple® iTunes® and any one of various podcasting servers, that displays available content, and transmits content to users. In another implementation, content hosting system 40 may be a media aggregation or sharing system, such as the Flickr® photo sharing site, YouTube™ video sharing site and similar variants.

As FIG. 1A illustrates, content hosting system 40 may comprise one or more physical servers 42 and a content data store 44. Content data store 44 stores content as digital content data objects. A content data object or content object, in particular implementations, is an individual item of digital information typically stored or embodied in a data file or record. Content objects may take many forms, including: text (e.g., ASCII, SGML, HTML, XML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Structurally, content data store 44 connotes a large class of data storage and management systems. In particular implementations, content data store 44 may be implemented by any suitable physical system including components, such as database servers, mass storage media, media library systems, and the like. As discussed herein, content data store 44 may also store tags and other information in association with corresponding digital content objects.

A.1.c. Search System

Search system 70 is a network addressable resource that provides search results responsive to queries transmitted from remote hosts. In particular implementations, search system 70 provides one or more links to content or other network resources in search result listings. Search system 70 may provide search results including links to sponsored and/or unsponsored resources. Search system 70, in some implementations, includes one or more physical servers 72, 73 and data stores 74, 75. Search system 70, in some implementations, includes at least two types of servers, where both types have HTTP, HTTPS, SSL, FTP, and/or other functionality that allows remote access over a network. A first server type may be an account management server 72. The account management server 72 operates in connection with account management data store 74. The account management data store 74 contains advertiser account information. General-purpose browsers or special-purpose client applications, running on client nodes 82, may be used to access advertiser account information stored in account management data store 74. An advertiser may, through account management server 72 and an account residing on the account management data store 74, participate in a competitive bidding process with other advertisers. An advertiser may bid on any number of search terms relevant, for example, to the content of the advertiser's web site.

A second server type may be a search engine server 73. A search engine server 73 executes one or more search engine programs that permit users, upon navigating to the search engine web server URL or sites on other web servers capable of submitting queries to the search engine server 73, to enter queries to search for network resources of interest. In a particular implementation, the search engine server 73 may generate a search result list that includes, at least in part, relevant entries obtained from and formatted by the results of a bidding process conducted in connection with the account management server 22. The search engine server 73 may generate a list of hypertext links to documents or other resources that contain information relevant to search terms entered by a user. The search engine server 73 transmits this list, in the form of a web page, to the network user, where it is displayed on a browser or other client application running on a client node 82, 84.

In particular implementations, search engine server 73 operates in connection with a search data store 74 including search listing records used to generate search results in response to user queries. In addition, search engine server 73 may also be connected to the account management server 72. One or more of the search listings, in some implementations, correspond to a search term-bid pairing and contains information to conduct the online competitive bidding process. In some implementations, each search listing comprises a search term, a web site description, a URL, a bid amount, and a title. The search term may comprise one or more keywords which may be common words in English (or any other language). Each keyword in turn comprises a character string. The search term is the object of the competitive online bidding process. The advertiser selects a search term to bid on that is relevant to the content of the advertiser's web site. Ideally, the advertiser may select a search term that is targeted to terms likely to be entered by searchers seeking the information on the advertiser's web site, although less common search terms may also be selected to ensure comprehensive coverage of relevant search terms for bidding. The web site description may be a short textual description of the advertiser's web site and may be displayed as part of the advertiser's entry in a search result list. The search listing may also contain a title of the web site that may be displayed as the hyperlinked heading to the advertiser's entry in a search result list. The URL contains the Uniform Resource Locator address of the advertiser's web site. When the user clicks on the hyperlink provided in the advertiser's search result list entry, the URL is provided to the browser program. The browser program, in turn, accesses the advertiser's web site through a redirection mechanism discussed herein. The URL may also be displayed as part of the advertiser's entry in a search result list.

A bid amount may be a money amount bid by an advertiser for a listing. This money amount is deducted from the advertiser's prepaid account or is recorded for advertiser accounts that are invoiced for each time a search is executed by a user on the corresponding search term and the search result list hyperlink is used to refer the searcher to the advertiser's web site.

Higher bids generally receive more advantageous placement on the search result list page generated by the search engine server 73 when a search using the search term bid on by the advertiser is executed. In a particular implementation, the amount bid by an advertiser comprises a money amount that is deducted from the account of the advertiser for each time the advertiser's web site is accessed via a hyperlink on the search result list page. A user "clicks" on the hyperlink with a computer input device to initiate a retrieval request to retrieve the information associated with the advertiser's hyperlink. In some implementations, each access or "click" on a search result list hyperlink is redirected to the search engine web server 73 to associate the "click" with the account identifier for an advertiser. This redirect action, in one implementation, accesses account identification information coded into the search result link before accessing the advertiser's URL. The account identification information is recorded in the advertiser's account along with information from the retrieval request as a retrieval request event. The information obtained through this mechanism matches an account identifier with a URL and allows for account debit records to be maintained. Beyond Pay-Per-Click schemes, other monetization schemes are possible, such as Pay-Per-Impression.

In particular implementations, the search result lists also includes non-paid or non-sponsored listings that are not placed as a result of advertiser bids and are generated by an algorithmic search engine. In one implementation, the non-paid search result listings follow, or are provided adjacent to, the paid or sponsored advertiser listings on the search results page.

When a user accesses a search query page provided by the search engine server 73 and executes a search request, the search engine server 73, in one implementation, generates and displays a search result list where the canonicalized entry in search term field of each search listing in the search result list matches the canonicalized search term query entered by the remote searcher. The canonicalization of search terms used in queries and search listings removes common irregularities of search terms entered by searches and web site promoters, such as capital letters and pluralizations, in order to generate relevant results. However, alternate schemes for determining a match between the search term field of the search listing and the search term query entered by the remote searcher are well within the scope of the present invention. For example, string matching algorithms known in the art may be employed to generate matches where the keywords of the search listing search term and the search term query have the same root but are not exactly the same (e.g., computing vs. computer). Alternatively a thesaurus database of synonyms may be used by the search engine server 73, so that matches may be generated for a search term having synonyms. Localization methodologies may also be employed to refine certain searches. For example, a search for "bakery" or "grocery store" may be limited to those advertisers within a selected city, zip code, or telephone area code. This information may be obtained through a cross-reference of the advertiser account database stored in account management data store 74.

Search result list entries may also show the rank value of the advertiser's search listing. The rank value is an ordinal value, preferably a number, generated and assigned to the search listing by search engine server 73. In some implementations, the rank value is assigned through a process that establishes an association between the bid amount, the rank, and the search term of a search listing. The process gathers search listings that match a particular search term, sorts the search listings in order from highest to lowest bid amount, and assigns a rank value to each search listing in order. The highest bid amount receives the highest rank value, the next highest bid amount receives the next highest rank value, proceeding to the lowest bid amount, which receives the lowest rank value. In some implementations, only the top N ranked search listings are provided in the first page of search results returned to the user.

Search system 70 also maintains one or more logs of user activity. Search system 70, for example, maintains query logs and page hit logs. As an example of a specific data collection operation, suppose that thousands of users connect to a search server and perform a search using the phrase "local weather". The search server 72 might respond to that phrase by presenting the user with a results page including links to pages relating to weather and specifically local weather (where locality might be inferred from user preferences or other methods). The search-server logs the search query itself, and possibly the time of the query, in a query log, and the "clicked-through" pages from the results page in a page hits log. A page is a "clicked-through" page when a user notes a reference to that page on the results page and selects that reference from the results page. In many HTTP systems, the effect of those actions is that the user's browser (or other HTTP client) requests the referenced page from the server indicated in the reference and the referenced server responds to the request with the referenced page. As discussed below, maintaining these statistics in a time-based format allows for time-windowed and/or trend analysis of the search log data.

To allow search system 70 to track user clicks, the search links of a results page, in one implementation, include URLs that correspond to search system 70, but also include encoded information that maps to a URL of an underlying network resource, such as an advertiser web site, a document data store, etc. Accordingly, in one implementation, search system 70 generates encoded URL identifiers for one or more URLs in a page of search results, and adds these encoded URL identifiers as a parameter to a redirection URL that identifies search system 70. For example, the encoded URL identifier may be one or more strings and be included in the following example URL: http://search.yahoo.com/_rdrct=UJASf4&SIG=11aygd. In one implementation, search system 70 stores the encoded URL identifier in association with the corresponding link for later use. After generating one or more encoded URLs for inclusion in the search results, search system 70 may transmit the results to a requesting client node.

In particular implementations, redirection generally refers to transmitting a message from a server to a client application, for example, that causes the client application to access another server or resource without intervention or action by the end-user. Redirection can be accomplished in a number of different ways. For example, in connection with HTTP, redirection messages can be implemented using refresh meta tags, such as

```
<html><head>
 <meta http-equiv="refresh" content="0; url=http://www.yahoo.com/">.
```

In addition, redirection messages can be implemented using HTTP refresh headers.

```
HTTP/1.1 200 ok
Refresh: 0; url=http://www.yahoo.com/
Content-type: text/html
Content-length: 78
Follow <a href="http://www.yahoo.com/">link</a>.
```

Redirection can also be accomplished by transmitting an HTML page including JavaScript code operative to accomplish redirection. Other suitable redirection methods can be used for other protocol environments.

As discussed in more detail below, search system 70 is operative to analyze its query and/or page hit logs to compute measures of interest in one or more of keywords, topics and/or categories. Dynamic pricing system 20 may map a content object to such keywords, topics and/or categories, determine a measure of interest and dynamically compute a price for the content object.

A.1.d. Client Nodes

Client node is a computer or computing device including functionality for communicating over a computer network. A client node can be a desktop computer 82, laptop computer, as well as mobile devices 84, such as cellular telephones and personal digital assistants. A client node may execute one or more client applications, such as a web browser, to access and view content over a computer network. In particular implementations, the client applications allow users to enter addresses of specific network resources to be retrieved. These addresses can be Uniform Resource Locators, or URLs. In addition, once a page or other resource has been retrieved, the client applications may provide access to other pages or records when the user "clicks" on hyperlinks to other resources. In some implementations, such hyperlinks are located within the web pages and provide an automated way for the user to enter the URL of another page and to retrieve that page. The pages or resources can be data records including as content plain textual information, or more complex digitally encoded multimedia content, such as software programs or other code objects, graphics, images, audio signals, videos, and so forth.

A.2. Example Protocol Environment

The networked systems described herein can communicate over the network 60 using any suitable communications protocols. For example, client nodes 82, as well as various servers of the systems described herein, may include Transport Control Protocol/Internet Protocol TCP/IP networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. Still further, in particular implementations, the information transmitted between hosts may be formatted as HyperText Markup Language (HTML) documents. Other structured document languages or formats can be used, such as XML, and the like.

In some client-server protocols, such as the use of HTML over HTTP, a server generally transmits a response to a request from a client. The response may comprise one or more data objects. For example, the response may comprise a first data object, followed by subsequently transmitted data objects. In one implementation, for example, a client request may cause a server to respond with a first data object, such as an HTML page, which itself refers to other data objects. A client application, such as a browser, will request these additional data objects as it parses or otherwise processes the first data object.

Mobile client nodes 84 may use other communications protocols and data formats. For example, mobile client nodes 84, in some implementations, may include Wireless Application Protocol (WAP) functionality and a WAP browser. The use of other wireless or mobile device protocol suites are also possible, such as NTT DoCoMo's i-mode wireless network service protocol suites. In addition, the network environment may also include protocol translation gateways, proxies or other systems to allow mobile client nodes 84, for example, to access other network protocol environments. For example, a user may use a mobile client node 84 to capture an image and upload the image over the carrier network to a content site connected to the Internet.

A.3. Example Computing System Architectures

The client and server host systems described herein can be implemented in a wide array of computing systems and architectures. The following describes example computing architectures for didactic, rather than limiting, purposes.

FIG. 2 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/out-put (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel. Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interlace between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

B. Content and Tags

In a particular implementation, a user (content uploader) may access content hosting system 40 over computer network 80, or a LAN within the domain of content hosting system 40, with a client node to upload content. In one implementation, a special-purpose client application may be used to select content and upload one or more selected content objects to content hosting system 40. In another implementation, client computer 82 includes a browser or other client application that parses and displays Hyper-Text Markup Language (HTML) pages transmitted from content hosting system 40. In one implementation, content hosting system 40 may transmit a page-based interface including functionality allowing a user to select content and upload it to content data store 44. Using the page-based interface, a content uploader may identify a data file embodying the content, and cause the data file to be uploaded to content data store 44.

The content uploader may also specify one or more tags, and possibly other attributes of the content object. For example, a user may upload the content in connection with a digital rights management engine, see below, that incorporates the configuration of tags into the content submission workflows. The tags associated with the content can vary considerably. The tags can relate to the subject of the content (subject, location, etc.), the circumstances involving creation of the content (date, author, time, image capture settings, etc.), and the like. Other data can be associated with the content. For example, the tags need not be entered by the user who uploaded the content. Rather, the tags or other information may be entered by other users after accessing and viewing the content. In addition, one or more tags can be automatically extracted based on analysis of the content. For example, the digital file including the underlying content, such as an image or video, may also include one or more tags in reserved data fields. Other information can include the date and time when the content was uploaded. In addition, if the content includes text, content hosting system 40, for example, can execute a programmatic process to extract one or more tags from the content. Still further, content may also be tagged with one or more geographical locations or geo-tags.

Other tags or attributes of the digital content object can also be recorded, such as a device that captured the data of the object (e.g., such as the camera used to capture an image), quality characteristics of the content (e.g., pixel resolution, color resolution, etc.), the author or creator of the image, and the like.

C. Sources of Aggregate Internet User Preference Data

The dynamic pricing models disclosed herein operate in connection with one or more sources of information capturing relatively current, aggregated information about Internet user preferences and behavior. Algorithmic search engines, such as that offered by Yahoo! Inc. (search.yahoo.com), register millions of key word search queries each day. The greater majority of Internet users regularly rely on search engines in order to locate Web sites, information and commercial items of interest. Search engine operators, therefore, because they capture millions of user queries, have access to rich stores of data regarding which subject matter is generating more or less interest at a given point in time. Query logs maintained by search engines, for example, can include one or more entries including a query string and a time stamp. Query log entries can contain additional attributes as well, such as the search segment (e.g., images, local, shopping, etc.) specified by users. Such query logs can be aggregated to yield statistics regarding a variety of information including the frequency of the query strings, one or more keywords in the query strings, the concepts or categories of the query and the like. Additionally, search engine operators capture real time information regarding those Web sites of interest to which users navigate once a listing of relevant search results are returned in response to given queries (user behavior). Thus, data generated by search engines concerning user query and navigation patterns can provide extremely probative, useful information regarding the aggregate desires and preferences of the Internet user population en large for obtaining or accessing certain types of information, including graphical or other rich digital content. Such aggregated information provides an excellent means for understanding the marketplace demands of users for different products, services and items of information and entertainment, including digital content. This aggregated information reflecting ever-shifting user preferences can be beneficially used to price, dynamically, supplies of discrete digital content objects related to such preferences. The incorporation of such current or virtually real time user preference information enables digital content owners to offer pricing for content objects that will allow them to better maximize commercialization volumes and/or realization of value from discrete content objects.

In one particular embodiment, the dynamic pricing model disclosed herein makes recourse to query and other logs of algorithmic and/or sponsored search engines as the primary source of aggregated information reflecting user preferences. In other implementations, the dynamic pricing model disclosed herein accesses post-processed information derived from analysis of query and/or page hit logs of algorithmic and/or paid search engines. It should be appreciated, however, that any repository of relatively current information reflecting user preferences can be used to provide the aggregated information for dynamically setting pricing for content objects. For example, such information sources can include databases containing regularly updated survey response data, or those containing regularly updated actual sales figures for commerce objects closely related in theme, or otherwise, to offered digital content objects (e.g., sales volume data for DVDs starring Celebrity X can be factored into pricing of digital photos of Celebrity X).

D. Dynamic Pricing Algorithms

In one implementation, dynamic pricing system 20 may be configured to operate in a variety of modes. For example, in one implementation, dynamic pricing system 20 operates, relative to a given digital content object, in connection with an initial price point or baseline price. The initial price point or price parameter can either be assigned arbitrarily by the content owner (or distribution agents of the content owner), or otherwise derived and assigned algorithmically based on general marketplace pricing or other relevant conditions. For example, dynamic pricing system 20 may compute an initial baseline price for a digital content object. A user may accept this baseline price or override this suggestion and input a desired baseline price. Still further, as to the price for a given content object, the dynamic pricing system 20 may be constrained by a minimum and/or maximum price (configured by a user or algorithmically determined by the dynamic pricing system 20). The disclosed model for dynamically pricing digital content can be employed in all phases of content pricing, including establishing a baseline price. In one implementation, the dynamic pricing scheme operates in connection with baseline pricing—Initial Price Point ("IPP") and a minimum and maximum price parameter ("PP") for each offered content object.

In marketplaces where thousands or millions of content objects are offered, including many closely similar objects offered by different content sources, determining baseline pricing can be a difficult undertaking. Undifferentiated fixed prices for similar content objects may over price or under price objects given quality and overall appeal differences among such similar objects. Offerors of content in such marketplaces (whether content owners or marketplace proprietors) have been ill-equipped and challenged to establish baseline pricing for their objects relative to other objects of similar content. Online music proprietors, such as Apple® Computer, Inc., have resorted to fixed pricing for single song music files ($0.99 per item). Others, such as Real Networks, make all of their content available for a monthly subscription fee. In both of these models, content objects are treated as somewhat fungible, and given either a single, set purchase price, or pooled such that all objects are made available during a certain time period for a fixed bulk price.

These pricing approaches fail to offer content owners the ability to charge unique prices for individual content objects, which may be of greater or lesser quality and overall appeal. Similarly, these pricing approaches fail to offer individual content objects to consumers at prices that more closely reflect actual demand. Certain objects will be under-priced and sold at a price point below what consumers are willing to pay, thus depriving the content owner recovery of full profit margins on sales of that object. Certain objects will be over-priced and sold at a price point above what consumers are willing to pay, thus depriving the content owner of better sale volumes for that object. In marketplaces including original content offered by amateurs, where the quality of offered similar objects will vary even more drastically, and there is no brand recognition for either the content object itself or its offeror, the existing pricing models are even more unsuitable.

Different sets of pricing algorithms can be applied to the aggregated measures of user interest to be processed for dynamic pricing in connection with a given digital content object. For any content object, it may be desired to offer several price tiers, depending on the various licensed uses to be permitted for that object, or whether it will be offered for sale, syndication or via other commercialization mode. Thus, not only can different initial price points or minimum/maximum price parameters be generated for a single content object, but the manner in which that pricing is set to adjust dynamically can be algorithmically customized for each commercialization mode in which the object will be offered. To the extent that such tiered pricing takes into account different IPRs associated with a content object, the algorithmic functions for pricing each such IPR tier may be factored at different stages in the process, for instance right before, simultaneously with, or right after, a real time price point has dynamically been set based on user preference data. In each such case, the algorithmic functions for each IPR tier are made part of the overall dynamic price generation and the result is several distinct dynamic price outputs for each content object.

D.1. Baseline Pricing

In particular implementations, the present invention discloses methods for establishing initial pricing for digital content objects. It represents an improvement over existing pricing approaches by well-known online proprietors of digital content by allowing object-specific price differentiation, which is important in markets with large inventories and highly fluctuating demand. Moreover, such object-specific price differentiation enables marketplaces for amateur-created digital content to establish suitable and unique baseline IPPs and PPs for individual content objects. The disclosed method for establishing baseline IPPs and PPs can be employed to set fixed prices and used without any additional dynamic pricing models. In one embodiment, however, the disclosed method can be used to establish IPPs and PPs in a dynamic pricing system.

Many inherent features of a particular object of digital content can help to determine its baseline market value relative to other similar content objects. Two pictures of the Taj Mahal may vary in quality—in respect of lighting, picture composition, weather conditions at the time each picture was taken, and quality of equipment used to take each photograph (ratable visual quality; objective production or rendered quality). Consider, too, that a picture taken of a famous movie celebrity by a professional photographer for eventual release by that celebrity's publicist or movie studio will mostly always be more valuable than a photo taken by an adoring fan, all other circumstances being equal (source of content). Thus, in devising a system for generating dynamic pricing for numerous digital content objects, it is useful to establish baseline values deriving from the inherent attributes of the content object itself. Thereafter, context-specific data, can better be taken into account to generate an actual, dynamically changeable market price &r the content object.

In a system that establishes values for the inherent features ("attributes") of individual content objects and then compares these values with those of other content objects for the purpose of generating differentiated IPPs and PPs, it is useful to have an algorithm-driven scoring system.

1. Scoring Content According to its Source

Not all content creators, content owners or content proprietors are created equal in terms of popular brand appeal and how this, in turn, can affect initial pricing ability, including premium pricing opportunities. A variety of methods can be devised to algorithmically assign values to, or score, individual content objects depending on the identified source of that content object. As an attribute parameter, "source" in the present baseline pricing model can include all or any of a content object's creator, owner or proprietor. Because the popularity and brand appeal of creators, owners and proprietors of content vary over time, the scoring values for each such source would be adjustable.

2. Scoring content according to its Subject Matter

Taking a marketplace for digital photos, it is useful to understand the many ways in which a single photo may be coded or tagged such that it can retrieved by interested parties who may use any of several different search criteria to locate objects matching their interests. Generally, any given photo may be tagged with key words (or phrases) that reflect high levels of generality to very specific details about that photo. For example, a given photo may be tagged "man," "man smiling," "man smiling outdoors," "African American man smiling outdoors," "Denzel Washington smiling outdoors." Scoring for subject matter can he based on the background popularity of each key word associated with a digital content object, as well as on the relatively popularity of key phrases that may be formed using such key words.

3. Scoring content according to its Technical Production Quality

There are a variety of ways in which the technical production or rendered quality of a digital content object can be determined automatically by an application for managing electronic files. Information about the device or devices producing the digital content objects, the file size and format, bit rates, compression rates, code rates, pixel resolution, color scale, its fully rendered production quality, etc. can be used to score the technical production quality of a content object.

4. Scoring content according to its Peer-Reviewed Quality Rating

To the extent that the digital content to be priced will be made subject to a ratings system, this information may also be factored into attribute pricing. Certainly peer ratings of quality are subjective and can be considered not truly "inherent" to a content object. To the extent, however, they are closely associated to each rated content object, such ratings can provide another unique, measurable and relatively unbiased criterion with which to differentiate between content objects.

5. Scoring content according to other features that can be assessed as Inherent Attributes There are other features inherent, or closely related to, digital content objects that can be used in establishing baseline pricing for them. For instance, in some marketplaces, it may be deemed useful to factor in specific IPR restrictions associated with a content object in its scoring. Such a marketplace may be one where the content object will not be offered at different pricing tiers based on various use cases, but instead will be offered at only one price that takes into account the mix of permitted and restricted use cases associated with that object.

Many different techniques for generating and assigning attribute scores to content can be devised. Such attribute scoring can be simplistic, or it can make recourse to more sophisticated algorithms depending on the amount of attribute types within a given attribute category, the weight to be assigned to each attribute type and how the attribute types assigned within each attribute category are to be cross-correlated. FIG. 3 illustrates a pricing method, according to one particular implementation of the invention. In one implementation, dynamic pricing system 20, when requested, can collect one or more attributes of a digital content object (102), and compute component scores based on the attributes (104). As discussed above, the component scores may correspond to source, subject matter, peer-reviewed quality, technical reproduction quality, or other factors. Dynamic pricing-system 20 may weight each component score (106) and compute an aggregate score (108). The aggregate score may be an input, along with other attributes of the digital content object, to a context-driven pricing algorithm (110). The context-driven pricing algorithm, in one implementation, is operative to compute a price by identifying a category for the digital content object, where the category has a minimum and maximum price parameter. For example, there may be different categories, one or more including several sub-categories, for photographic images, animations, videos, short stories, news articles, and the like.

The content-driven pricing algorithm computes a price for a digital content object, within the minimum and maximum price parameters for the identified category, based on the aggregate score. In one implementation, the aggregate score can be normalized to a range (e.g., between 1 to 100), where the value of the aggregate score determines the extent to which a price level above the minimum price parameter will be assigned to a digital content object. Other implementations are also possible. For example, the context-driven pricing algorithm may assign the minimum price parameter if the aggregate score falls below a threshold. Still further, one or more of the component scores may determine the minimum and maximum price parameters to be used. For example, if the "source" component score crosses a threshold (indicating it is a "professional" or popular source), a different, usually higher set of minimum and maximum price parameters can be selected. The computed price can be returned to a user for acceptance or override. The computed or user-configured initial price point can be stored in association with the digital content object or maintained by dynamic pricing system 20 in association with a unique identifier for the digital content object. Furthermore, the context-driven pricing algorithm may also return the maximum and minimum pricing parameters to the user for acceptance or override. These parameters may also be stored in association with the content object.

D.2. Dynamic Pricing

A content hosting system, such as content hosting system 40, may access dynamic pricing system 20 to retrieve a current, dynamically computed price for a digital content object. A variety of implementations are possible. For example, content hosting system 40 may access dynamic pricing system 20 each time a user requests a given digital content object. In some implementations, content hosting system 40 may cache the dynamically computed price received from dynamic pricing system 20. Content hosting system 40 may re-use this price without accessing dynamic pricing system 20 until some condition is satisfied (e.g., expiration of a threshold period of time, and the like). In other implementations, the HTML pages or other resources provided by content hosting system 40 may include embedded calls to dynamic pricing system 20, which when executed cause a client browser application to request a price for an identified content object.

Dynamic pricing system 20 may incorporate a variety of different pricing algorithms. The following illustrates one particular dynamic pricing algorithm for didactic purposes. As FIG. 4 illustrates, in one implementation, the dynamic pricing system 20, responsive to a request for a price for a digital content object, identifies one or more tags, and possibly other attributes, associated with the digital content object (302). In one implementation, dynamic pricing system 20, receiving a resource locator for the digital content object, may access a content data store 44 to access the tags or attributes of the digital content object. In other implementations, the tags or attributes of the digital content object may be passed as parameters in the request. In one implementation, dynamic pricing system 20 may operate as a network-addressable service. In one implementation, a content hosting site 40 may embed in web pages that display a price an API call to dynamic pricing system. In one such implementation, the web page may include an embedded code module, such as JavaScript, that, when downloaded and activated within the context of a browser application, makes a call to dynamic pricing system 20 for a price. In another implementation, a server 42 of the content hosting site 40 may access dynamic pricing system 20 when constructing a web page that includes a price for a digital content object.

Dynamic pricing system 20 may then access one or more data stores of Internet user preference or behavior information against the identified tags (304). In one implementation, one of the data stores of Internet user behavior information are query logs of a search engine, such as search system 70. In one particular implementation, the query and page hit logs can be analyzed to determine a statistical measure of interest in a given term, topic and/or category. For example, search system 70 can implement the activity monitoring and interest scoring functionality disclosed in U.S. Pat. No. 7,146,416, which is incorporated by reference herein. Search system 70 may use this technology to compute and maintain statistical measures or scores of interest (so-called "buzz" values) in terms, topics, and/or categories. In addition, the search system 70 may also track changes or trends in buzz values. For example, a "buzz" value may represent the level of interest of a subject, such as a movie, a person, product, place, or event, cultural phenomena, etc., and change in buzz value might be indicative of a trend. The buzz value, in one particular implementation, can be calculated as the number of unique users searching for that subject anywhere on a portal site or set of portal sites, or viewing a page of content relevant to that subject anywhere on the portal site or set of portal sites. A buzz value might also be calculated without regard to whether each event that is counted is originated by a unique user.

The buzz values can be used to identify cultural trends, track interest in specific brands, measure the effectiveness of marketing campaigns, etc. For buzz events that are purchase events, the count by which a bin is incremented might be a function of purchase amount, so that purchases of larger amounts have more of an effect on a product's buzz than purchases of smaller amounts. In one particular implementation, the buzz value associated with a particular term or category is the number of users searching with that term, or viewing a page related to that term, divided by a sum of users searching, where the sum can be the sum of users searching over all subcategories in a category, sum of users searching over all terms in a category, or the sum of all users searching anywhere on the site. The latter normalization is useful to factor out time-based increases in traffic, such as weekday-weekend patterns, seasonal patterns and the like. A normalization factor might be applied to all terms being compared so that the buzz values are easily represented. For example, if there are four terms in a category, 100 total unique user hits on those four terms (25, 30, 40 and 5, respectively) out of one million total unique users, a normalization factor of 100,000 might be applied so that the buzz values are 2.5, 3, 4 and 0.5, instead of 0.000025, 0.00003, 0.00004 and 0.000005. Normalization can also be used when determining the buzz surrounding one company or product against an index of other companies or products within a particular market segment or product category.

In some implementations, trend values can also be computed. For example, a trend value can be computed based on the change between a buzz value for a given term, topic or category from one day to the next. Other trend values based on longer or shorter periods can also be computed. In some cases, the buzz values for a subject might he a leading indicator for electronic commerce transactions relevant to that subject. For example, the buzz for the term "widget" might rise and be followed by increased on-line purchases of widgets. Such information may be useful in the dynamic pricing mechanisms described herein.

In one implementation, dynamic pricing system 20, or search system 70, may map the digital content object to one or more of a term, topic and/or category having a statistical measure of interest (304), and use the mapped values to estimate a measure of interest in the digital content object (306). For example, in one implementation, the tags associated with a content object can be mapped to a topic. The buzz value of the topic, and/or the trend of the buzz value, for the topic may be used in computing a price for a digital content object. In another implementation, each tag of a digital content object can be mapped to a respective term having a buzz value. The respective buzz values can be aggregated (and optionally weighted prior to aggregation) to compute a composite score. Trend values can also be weighted and aggregated in a similar manner.

The dynamic pricing system 20 can use a variety of algorithms to compute a price given one or more statistical measures of interest (308). In one implementation, the dynamic pricing system 20 may use an algorithm that considers the initial price point (IPP) of a given content object, and the change in buzz values between the time when the IPP was initially computed and the time of the request. In one implementation, the algorithm can be characterized by the following equation:

---

Dynamic Price = CP, where CP = IPP * w (buzz(t) / buzz($t_{ipp}$)),
  if minPrice ≤ CP ≤ maxPrice;
  else
  minPrice, if CP < minPrice; or
  maxPrice, if CP > maxPrice;
where
  IPP is the initial price point for a content object;
  minPrice is the minimum price for the content object;
  maxPrice is the maximum price for the content object;
  w is a weighting factor;
  buzz(t) is the current value at time t; and
  buzz($t_{ipp}$) is the buzz value at the time the initial price point was computed.

---

As the foregoing illustrates, the dynamic pricing algorithm may be constrained by minimum and/or maximum pricing parameters (310). That is, in one particular implementation, the price returned (312) does not exceed such parameters.

In another implementation, a base line or nominal price for a given content object can be used in a dynamic pricing algorithm. In such an implementation, the equation for CP, above, can omit buzz($t_{ipp}$) as a divisor, and replace IPP with a baseline or nominal price. In yet another implementation, the trend of the computed buzz value can also be incorporated into the dynamic pricing algorithm. For example, the following algorithm can be used:

---

Dynamic Price = CP, where CP = BP * (w1((buzz(t)) + w2(trend(t)),
  if minPrice ≤ CP ≤ maxPrice;
  else
  minPrice, if CP < minPrice; or
  maxPrice, if CP > maxPrice;
where
  BP is the baseline price for a content object;
  minPrice is the minimum price for the content object;
  maxPrice is the maximum price for the content object;
  w1 and w2 are weighting functions that vary with buzz(t) and trend(t), respectively;
  buzz(t) is the current value at time t; and
  trend(t) is the current trend for the buzz.

---

D.2.a. Segmented User Preference Data in Dynamic Pricing

In one implementation, dynamic pricing system 20 may parse and weight different types of query targets pursued within an algorithmic search engine. Most popular search engines today allow targeted searching for segmented search results, such as news articles, images, video, etc. Thus, for the purpose of gauging aggregated user interest in particular persons, objects, topics or information, it is possible to look at the popularity of a given key word search query, topic or category across all targeted search segments. However, it may also be desirable to develop a more nuanced assessment of how relatively popular a particular query is within each search segment, or to weight and aggregate buzz and/or trend values for search queries across two or more search segments (e.g., images, video, local, shopping, news, etc.). If, for instance, the primary target market for a particular content object is news media producers, then the content offeror may care most about the popularity of related queries in the news search segment in one or more popular search engines. In addition, if the digital content object is a video, a buzz value from the "video" and/or "image" search segment may be weighted more highly, or used exclusively.

Taking a more detailed example, the overall relative popularity of Celebrity X may be determined by looking just at the combination of queries focusing on, or related to, Celebrity X in all segments of one or more search engines. These cross-segment results can beneficially be used as factors in the disclosed dynamic pricing model. However, for certain content objects for which a more fine tuned assessment of popularity may be desired in order to determine dynamic price points for that object, it is possible to compare and weight any differences in search query frequency within two or more search segments. The scenario modeled in FIG. 5 takes a 10 week snapshot of events in Celebrity X's life and the output/consumption of information about Celebrity X as reflected in user search queries (or other captured expressions of user interest) in 3 segments: news, movies, and video. Assume for this snapshot that a new movie about Celebrity X is released at the end of week 2, but Celebrity X begins appearing more frequently on talk shows two weeks prior to the release and then even more so in the week of release and a few weeks thereafter. So too, news features mentioning or focusing on Celebrity X begin to increase right before the movie release and then moreso following the movie release. After two weeks in release the movie begins to decline in popularity at the box office. So too, news articles and talk show appearances featuring Celebrity X also decline. However, sometime in week 8, a scandal about Celebrity X's alleged extramarital activities breaks, causing a sharp spike in news coverage. The scandal also serves to boost movies sales somewhat, as well as demands for Celebrity X's appearance on talk shows.

Figure 5:
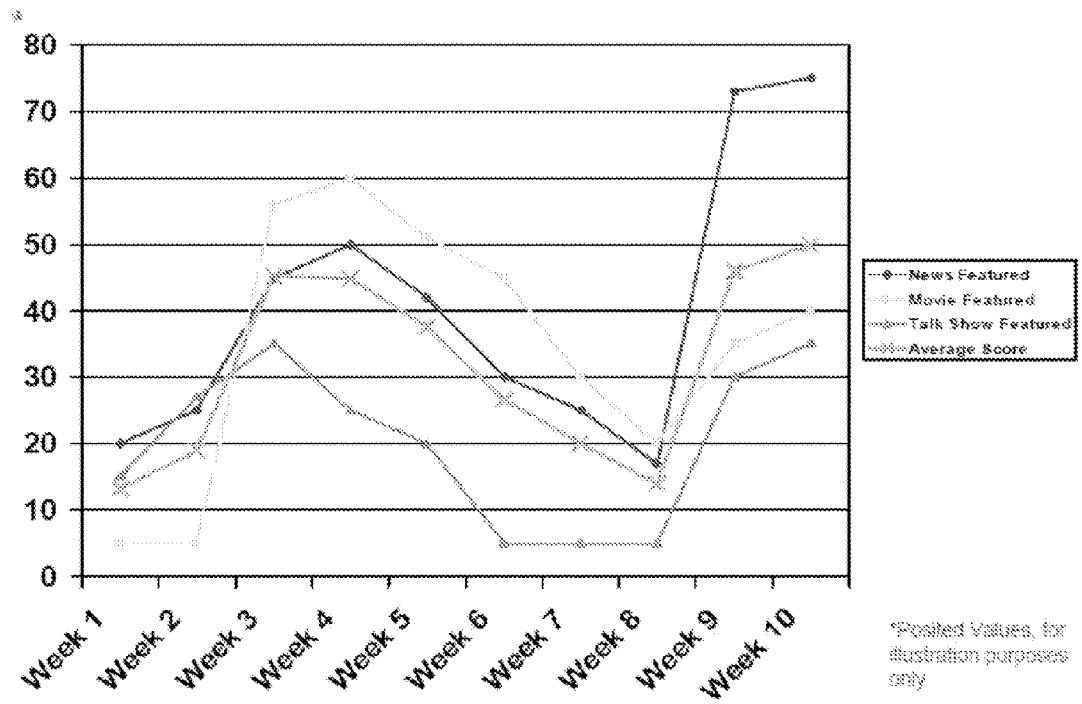
FIG. 5 is a chart plotting popularity of a topic or subject across a plurality of search segments.

The plot points illustrated in FIG. 5 are meant to illustrate scores, weighted or otherwise, that may be assigned to targeted search queries within news, movie and video search segments within one or more algorithmic search engines. (This approach assumes that talk show portions featuring Celebrity X are offered online as viewable video clips which are searchable in the video segment of popular algorithmic search engines.) Alternatively, the "news featured" and "movie featured" plot points may both be drawn from query popularity in the equivalent algorithmic search engine segments, while the "talk show featured" plot points are derived from a specialized database of viewership ratings for various television programs. If a content hosting site 40 were to offer digital photos of Celebrity X using dynamic pricing to a general set of consumers, it might factor in the average level of query popularity for Celebrity X across all search segments. If, however, the target market for digital photos of Celebrity X was to be news media producers, then our dynamic pricing might factor in only query popularity of Celebrity X in the news search segment. Taking the latter approach, as indicated in FIG. 5, the pricing for Celebrity X digital photos would be slightly higher, and more so during the period following the onset of Celebrity X's scandal.

E. Use of Dynamic Pricing Models with a Rights Management Engine

In a particular implementation, as in FIG. 1, the disclosed dynamic pricing system which employs search engine data, or other relatively current user preference data, would be used to price digital content that is managed and transacted within a rights management application ("RME"), as disclosed in U.S. application Ser. No. 11/580,320, which is incorporated by reference herein. As a tool for centrally collecting and managing the distribution of digital content, a RME allows for the consistent cataloging and tagging of each content object being managed. There are many advantages to using a digital content RME in connection with a dynamic pricing model. A RME can facilitate establishing baseline pricing or price parameters for digital content objects that is based on inherent attributes of the content objects. Such attributes—such as content source, subject matter, and rated quality—are more easily catalogued for discrete content objects, and compared as between various content objects, in an RME that would capture such information at the time content is initially submitted. An RME can also facilitate cataloging, tagging and coding content objects using a consistent methodology. In addition to facilitating baseline pricing using content object attributes, an RME also facilitates DRM packaging for content objects, and transactions for each content object under a range of rights and usage cases. Each of these additional advantages, and the information about content objects that they generate, can be factored in to the disclosed dynamic pricing model. It should be appreciated, however, that the disclosed dynamic pricing model can be used for pricing digital content even without the use of a RME or related application. Even if the rights around a digital content object are not carefully secured and centrally managed, it may still be transacted using dynamic pricing models based on relatively current user preference data.

The present invention has been explained with reference to specific embodiments. For example, while embodiments of the present invention have been described as operating in connection with HTML and HTTP, the present invention can be used in connection with any suitable protocol environment. Other embodiments will be evident to those of ordinary skill in the art. It is therefore not intended that the present invention be limited, except as indicated by the appended claims.

What is claimed is:

1. A method comprising:
   accessing, by one or more computing devices over a network, a data store of user behavior information for data related to one or more attributes of a content object and tags relating to the content object, the user behavior information comprises information relating to search activities conducted by one or more users, the tags comprising information relating to a subject of the content object and rendering of the content object;
   determining, by the one or more computing devices, one or more measures of interest for the content object from the user behavior information, the one or more measures of interest being determined based upon statistical analysis of the user behavior information and the tags; and
   dynamically computing, by the one or more computing devices, a price for the content object based at least in part on one or more of the determined measures of interest.

2. The method of claim 1 wherein the user behavior information comprises a search query log including a plurality of query entries.

3. The method of claim 1 wherein the user behavior information comprises a page hits log containing user click-through data.

4. The method of claim 1 wherein accessing a data store comprises:
   accessing a search system maintaining statistical measures of interest for a plurality of terms, topics or categories;
   mapping, based on the attributes of the content object, the content object to one or more of a term, topic or category; and
   wherein a measure of interest for the content object is based at least in part on one or more of the statistical measures of interest corresponding to the one or more mapped term, topic or category.

5. The method of claim 4 wherein the search system includes a plurality of search segments, and is operable to maintain statistical measures of interest for a plurality of terms, topics or categories relative to each of the search segments; and
   wherein a measure of interest for the content object is based at least in part on the statistical measures of interest, across one or more search segments, corresponding to the one or more mapped term, topic or category.

6. The method of claim 5 further comprising selecting one or more search segments for determining a measure of interest.

7. The method of claim 6 further comprising weighting the statistical measures of interest corresponding to the to the one or more mapped term, topic or category within each selected search segment.

8. The method of claim 1 further comprising determining a trend for a measure of interest; and wherein the dynamically computed price is based at least in part on a measure of interest and the trend for that measure of interest.

9. The method of claim 1 further comprising computing an initial price for the content object based on one or more attributes of the content object.

10. The method of claim 9 wherein the one or more attributes comprise one or more of a source of the content object, a reproduction quality of the content object, a peer reviewed rating for the content object, or a restriction associated with the content object.

11. The method of claim 1 wherein the content object has an initial price associated therewith; and wherein the dynamically computed price is further based on the initial price.

12. The method of claim 1 wherein the dynamically computed price is bounded by a minimum and a maximum price parameter.

13. An apparatus comprising:
a memory;
one or more processors;
logic tangibly encoded in one or more non-transitory tangible media for execution by the one or more processors, and when executed operable to cause the one or more processors to:
access logic executed by the one or more processors for accessing, over a network, a data store of user behavior information for data related to one or more attributes of a content object and tags relating to the content object, the user behavior information comprises information relating to search activities conducted by one or more users, the tags comprising information relating to a subject of the content object and rendering of the content object;
determination logic executed by the one or more processors for determining one or more measures of interest for the content object from the user behavior information, the one or more measures of interest being determined based upon statistical analysis of the user behavior information and the tags; and
computation logic executed by the one or more processors for dynamically computing a price for the content object based at least in part on the determined measures of interest.

14. The apparatus of claim 13 wherein the user behavior information comprises a search query log including a plurality of query entries.

15. The apparatus of claim 13 wherein the user behavior information comprises a page hits log containing user click-through data.

16. The apparatus of claim 13 wherein the logic is operable to cause the one or more processors to:
access logic executed by the one or more processors for accessing a search system maintaining statistical measures of interest for a plurality of terms, topics or categories;
map logic executed by the one or more processors for mapping, based on the attributes of the content object, the content object to one or more of a term, topic or category; and
wherein a measure of interest for the content object is based at least in part on one or more of the statistical measures of interest corresponding to the one or more mapped term, topic or category.

17. The apparatus of claim 16 wherein the search system includes a plurality of search segments, and is operable to maintain statistical measures of interest for a plurality of terms, topics or categories relative to each of the search segments; and
wherein a measure of interest for the content object is based at least in part on one or more of the statistical measures of interest, across one or more search segments, corresponding to the one or more mapped term, topic or category.

18. The apparatus of claim 17 wherein the logic is operable to cause the one or more processors to:
selection logic executed by the one or more processors for selecting one or more search segments for determining a measure of interest.

19. The apparatus of claim 18 wherein the logic is operable to cause the one or more processors to:
weighting logic executed by the one or more processors for weighting the statistical measures of interest corresponding to the one or more mapped term, topic or category within each selected search segment.

20. The apparatus of claim 13 wherein the logic is operable to cause the one or more processors to:
determination logic executed by the one or more processors for determining a trend for a measure of interest; and wherein the dynamically computed price is based at least in part on a measure of interest and the trend for that measure of interest.

21. The apparatus of claim 13 wherein the logic is operable to cause the one or more processors to:
computation logic executed by the one or more processors for computing an initial price for the digital content object based on one or more attributes of the content object.

22. The apparatus of claim 21 wherein the one or more attributes comprise one or more of a source of the content object, a reproduction quality of the content object, a peer reviewed rating for the content object, or a restriction associated with the content object.

23. The apparatus of claim 13 wherein the content object has an initial price associated therewith; and wherein the dynamically computed price is further based on the initial price.

24. The apparatus of claim 13 wherein the dynamically computed price is bounded by a minimum and a maximum price parameter.

* * * * *